United States Patent
Rajagopal et al.

(10) Patent No.: US 11,105,245 B2
(45) Date of Patent: Aug. 31, 2021

(54) REDUCTANT CONCENTRATION DIAGNOSTIC SYSTEMS AND METHODS

(71) Applicant: Cummins Emission Solutions Inc., Columbus, IN (US)

(72) Inventors: Varun R. Rajagopal, Columbus, IN (US); Farshad Farid, Cranberry Township, PA (US); Jinqian Gong, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 128 days.

(21) Appl. No.: 16/468,526

(22) PCT Filed: Dec. 11, 2017

(86) PCT No.: PCT/US2017/065587
§ 371 (c)(1),
(2) Date: Jun. 11, 2019

(87) PCT Pub. No.: WO2018/111761
PCT Pub. Date: Jun. 21, 2018

(65) Prior Publication Data
US 2019/0309671 A1    Oct. 10, 2019

Related U.S. Application Data

(60) Provisional application No. 62/432,875, filed on Dec. 12, 2016.

(51) Int. Cl.
*F01N 11/00* (2006.01)
*F01N 3/20* (2006.01)

(52) U.S. Cl.
CPC ........... *F01N 11/00* (2013.01); *F01N 3/2066* (2013.01); *F01N 2550/05* (2013.01);
(Continued)

(58) Field of Classification Search
CPC .. F01N 11/00; F01N 2550/05; F01N 2610/02; F01N 2900/1402;
(Continued)

(56) References Cited

U.S. PATENT DOCUMENTS 9,050,561 B1    6/2015 Shetney et al.
2007/0079603 A1    4/2007 Hu et al.
(Continued)

OTHER PUBLICATIONS

First Office Action issued in Indian Patent Application No. 201947022301, dated Dec. 2, 2020, 6 pages.
(Continued)

*Primary Examiner* — Mark A Laurenzi
*Assistant Examiner* — Mickey H France
(74) *Attorney, Agent, or Firm* — Foley & Lardner LLP

(57) ABSTRACT

A system for diagnosing an improper reductant concentration includes: a selective catalytic reduction (SCR) catalyst unit, a doser configured to dose reductant into a chamber of the SCR catalyst unit, a reductant concentration sensor, and a controller. In some embodiments, the controller is configured to: direct the doser to dose the reductant into the chamber of the SCR catalyst unit, based on information received from the reductant concentration sensor, determine a reductant concentration level in the chamber of the SCR catalyst unit, compare a measured system-out $NO_x$ value to at least one benchmark value corresponding to the determined reductant concentration level, and determine a status of the reductant dosed by the doser based on the comparison of the measured system-out $NO_x$ value to the at least one benchmark value.

24 Claims, 5 Drawing Sheets

(52) U.S. Cl.
CPC .. *F01N 2610/02* (2013.01); *F01N 2900/1402* (2013.01); *F01N 2900/1602* (2013.01); *F01N 2900/1818* (2013.01); *Y02A 50/20* (2018.01); *Y02T 10/12* (2013.01); *Y02T 10/40* (2013.01)

(58) Field of Classification Search
CPC .......... F01N 2900/1602; F01N 3/2066; F01N 3/208; F01N 2900/1806; F01N 2900/1818; Y02A 50/20; Y02A 50/2325; Y02T 10/12; Y02T 10/24; Y02T 10/40; Y02T 10/47
USPC .......... 60/276, 277, 286, 287, 295, 301, 303
See application file for complete search history.

(56) References Cited

U.S. PATENT DOCUMENTS

| | | |
|---|---|---|
| 2009/0056310 A1 | 3/2009 | Xu et al. |
| 2010/0024390 A1 | 2/2010 | Wills et al. |
| 2010/0326051 A1 | 12/2010 | Busch et al. |
| 2012/0192548 A1 | 8/2012 | Shaikh et al. |
| 2012/0208692 A1 | 8/2012 | Munch et al. |
| 2014/0150409 A1 | 6/2014 | George et al. |
| 2014/0311428 A1* | 10/2014 | Miyagawa ............ F01N 3/2066 123/3 |
| 2014/0360166 A1 | 12/2014 | Chandrasekaran et al. |
| 2015/0096287 A1* | 4/2015 | Qi ....................... F01N 13/0093 60/286 |
| 2015/0273395 A1* | 10/2015 | Catalogna ............... F01N 3/208 423/212 |
| 2016/0115883 A1* | 4/2016 | Mischler ............. F02D 41/0072 123/703 |

OTHER PUBLICATIONS

International Search Report and Written Opinion from corresponding PCT Application No. PCT/US2017/065587, dated Feb. 20, 2018, pp. 1-9.

* cited by examiner

REDUCTANT CONCENTRATION DIAGNOSTIC SYSTEMS AND METHODS

CROSS REFERENCE TO RELATED APPLICATIONS

The present application is a U.S. national stage of PCT Application No. PCT/US2017/065587, filed Dec. 11, 2017, which claims priority to U.S. Provisional Patent Application No. 62/432,875, filed Dec. 12, 2016, the contents of which are incorporated herein by reference in their entireties.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a doser that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to reductant concentration diagnostics, for diagnosing an improper reductant concentration, which, in some embodiments, comprises diagnosing a defective reductant concentration sensor. In some embodiments, the reductant concentration sensor may be a urea quality sensor, a urea concentration sensor, etc.

One implementation relates to a system for diagnosing an improper reductant concentration. The system includes a selective catalytic reduction (SCR) catalyst unit, a doser configured to dose reductant into a chamber of the SCR catalyst unit, a reductant concentration sensor, and a controller. The controller is configured to direct the doser to dose the reductant into the chamber of the SCR catalyst unit. Based on information received from the reductant concentration sensor, the controller is configured to determine a reductant concentration level in the chamber of the SCR catalyst unit. The controller is configured to compare a measured system-out $NO_x$ value to at least one benchmark value corresponding to the determined reductant concentration level. The controller is configured to determine a status of the reductant dosed by the doser based on the comparison of the measured system-out $NO_x$ value to the at least one benchmark value.

In some embodiments, the reductant concentration sensor is configured to detect the reductant concentration for the reductant dosed by the doser, and the controller is further configured to determine a status of the reductant concentration sensor based at least on the comparison of the measured system-out $NO_x$ value to the at least one benchmark value. In some embodiments, the controller is configured to set a value indicative of the determined status of the reductant dosed by the doser. In some embodiments, the controller is further configured to trigger a warning lamp to be lit based on an interpretation of the set value. In some embodiments, the controller is further configured to output the set value to an auxiliary device via an output device.

In some embodiments, the measured system-out $NO_x$ value is a brake-specific system-out $NO_x$ (BS-SONO$_x$) value. In some embodiments, the at least one benchmark value is a first benchmark value, and the controller is further configured to set the first benchmark value to a value selected from a first set of system-out $NO_x$ values indicative of a sufficient reductant concentration level at a predetermined SCR catalyst unit temperature. The controller may be further configured to set a second benchmark value to a value selected from a second set of system-out $NO_x$ values indicative of a low reductant concentration level at the predetermined SCR catalyst unit temperature. The controller may be further configured to generate a single threshold value for the first set of system-out $NO_x$ values and the second set of system-out $NO_x$ values by normalizing the first benchmark value and the second benchmark value. The controller may be further configured to: normalize the first set of system-out $NO_x$ values for a sufficient reductant concentration, relative to the SCR catalyst unit temperature, to a 0 to 1.0 scale, normalize the second set of system-out $NO_x$ values for a low reductant concentration, relative to the SCR catalyst unit temperature, to the 0 to 1.0 scale, select a normalization factor from the 0 to 1.0 scale, the normalization factor corresponding to the SCR catalyst unit temperature; determine a normalized measured system-out $NO_x$ value; and compare the normalized measured system-out $NO_x$ value to the threshold.

In some embodiments, the controller is further configured to measure the system-out $NO_x$ value when the SCR catalyst unit is determined to be at the predetermined SCR catalyst unit temperature. In some embodiments, the controller is further configured to activate a high temperature regeneration event at a temperature between 480 and 600 degrees Celsius of the SCR catalyst unit prior to comparing the measured system-out $NO_x$ value to the at least one benchmark value.

In some embodiments, the controller is further configured to control the doser to dose reductant to maintain a constant ammonia-to-$NO_x$ ratio (ANR) prior to comparing the measured system-out $NO_x$ value to the at least one benchmark value. The controller may be further configured to calculate an amount of reductant to be dosed by the doser to match the measured system-out $NO_x$ value such that substantially all of the $NO_x$ is reduced by the reductant. The controller may be further configured to calculate the amount of reductant to compensate for noise from one or more sensors configured to capture a value of the measured system-out $NO_x$. In some embodiments, the controller is configured to monitor the brake-specific system out $NO_x$ value as a temperature of the SCR catalyst unit decreases, the temperature of the SCR catalyst unit being in a range of 220 degrees Celsius and 440 degrees Celsius.

Other implementations described herein relate to a method for diagnosing an improper reductant concentration. The method includes directing a doser to dose a reductant into a chamber of the selective catalytic reduction (SCR) catalyst unit. The method includes detecting a reductant concentration level in the chamber of the SCR catalyst unit.

The method includes comparing a measured system-out $NO_x$ value to at least one benchmark value corresponding to the determined reductant concentration level and determining a status of the reductant dosed by the doser based on the comparison of the measured system-out $NO_x$ value to the at least one benchmark value. In some embodiments, a status of a reductant concentration sensor is determined based at least on the comparison of the measured system-out $NO_x$ value to the at least one benchmark value, wherein the reductant concentration sensor is configured to detect the reductant concentration for the reductant dosed by the doser. In some embodiments, the measured system-out $NO_x$ value is a brake-specific system-out $NO_x$ (BS-SONO$_x$) value. In some embodiments, the method includes setting the at least one benchmark value to a value selected from at least one set of system-out $NO_x$ values indicative of a reductant concentration level at a predetermined SCR catalyst unit temperature. In some embodiments, any stored residual reductant is removed from the SCR catalyst unit prior to detecting the reductant concentration level. In some embodiments, the method includes dosing reductant to maintain a constant ammonia-to-$NO_x$ ratio (ANR). In some embodiments, the brake-specific system out $NO_x$ value is calculated as a temperature of the SCR catalyst unit decreases, the temperature of the SCR catalyst unit being in a range of 220 degrees Celsius and 440 degrees Celsius.

Other implementations described herein relate to sensor rationality diagnostics and, more particularly, to reductant concentration sensor rationality diagnostics for diagnosing a defective reductant concentration sensor compared to a benchmark for a low reductant concentration. One implementation relates to a system for diagnosing a reductant concentration sensor that includes a doser for dosing reductant, an SCR catalyst unit, a reductant concentration sensor configured to detect a reductant concentration for the reductant dosed by the doser, and a controller. The controller is configured to compare a measured system-out $NO_x$ value to a benchmark value responsive to an initial reductant concentration sensor fault and determine a status of the reductant concentration sensor based on the comparison of the measured system-out $NO_x$ value to the benchmark value.

In some other implementations, the controller is further configured to set a value indicative of the determined status of the reductant concentration sensor. In some instances, the set value triggers a warning lamp to be lit or the set value is output to another device via an output device. In some implementations, the measured system-out $NO_x$ value is a brake-specific system-out $NO_x$ (BS-SONO$_x$) value. In some implementations, the benchmark value is a value of a first set of BS-SONO$_x$ values for a sufficient reductant concentration level at a predetermined SCR catalyst unit temperature. The measured system-out $NO_x$ value may be measured when the SCR catalyst unit is at the predetermined SCR catalyst unit temperature. In some implementations, the controller is further configured to activate a high temperature regeneration event for the SCR catalyst unit prior to comparing the measured system-out $NO_x$ value to the benchmark value. In some implementations, the controller is further configured to control the doser to dose reductant to maintain a constant ANR prior to comparing the measured system-out $NO_x$ value to the benchmark value. In some implementations, the controller is further configured to monitor a brake-specific system out $NO_x$ (BS-SONO$_x$) as a temperature of the SCR catalyst decreases.

BRIEF DESCRIPTION

The details of one or more implementations are set forth in the accompanying drawings and the description below.

Other features, aspects, and advantages of the disclosure will become apparent from the description, the drawings, and the claims, in which:

Figure 3:
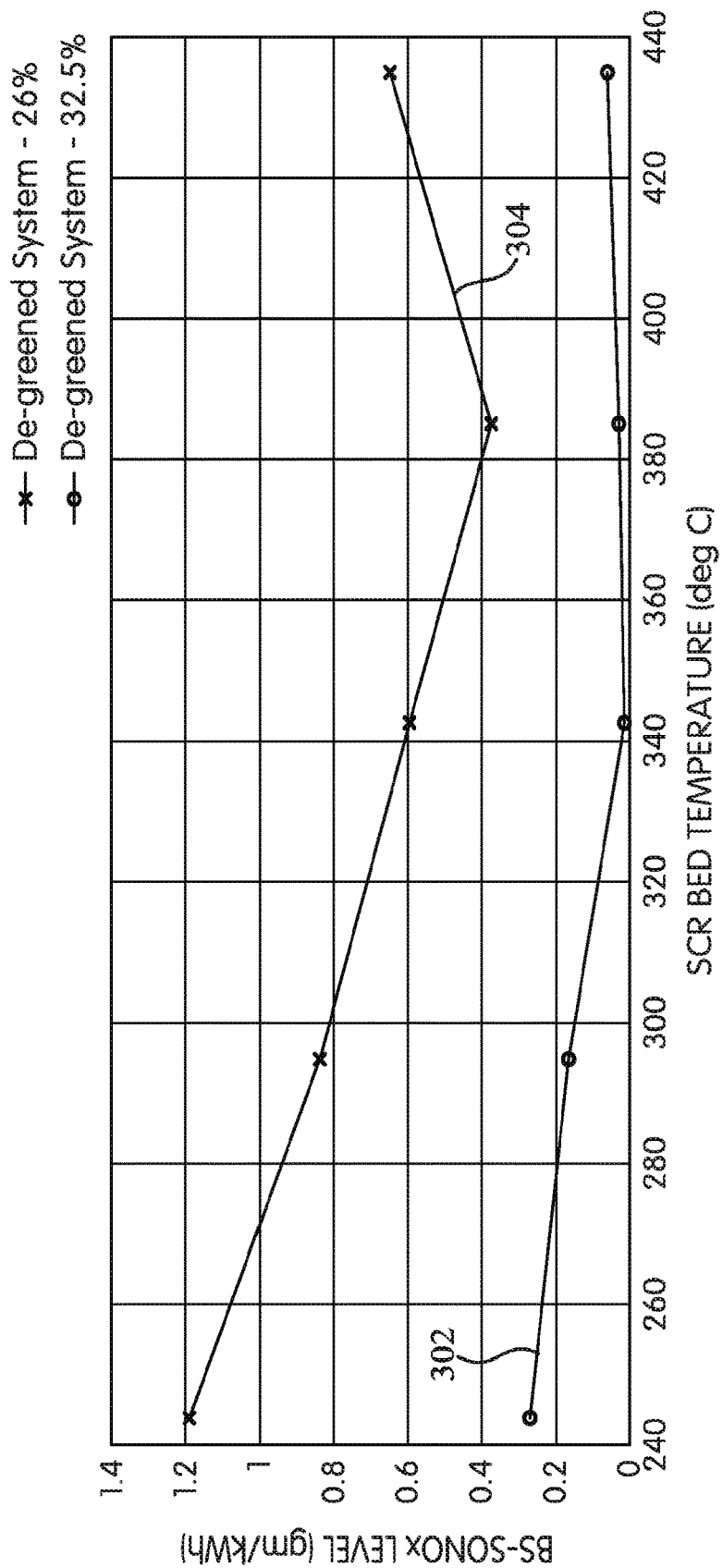
Figure 4:
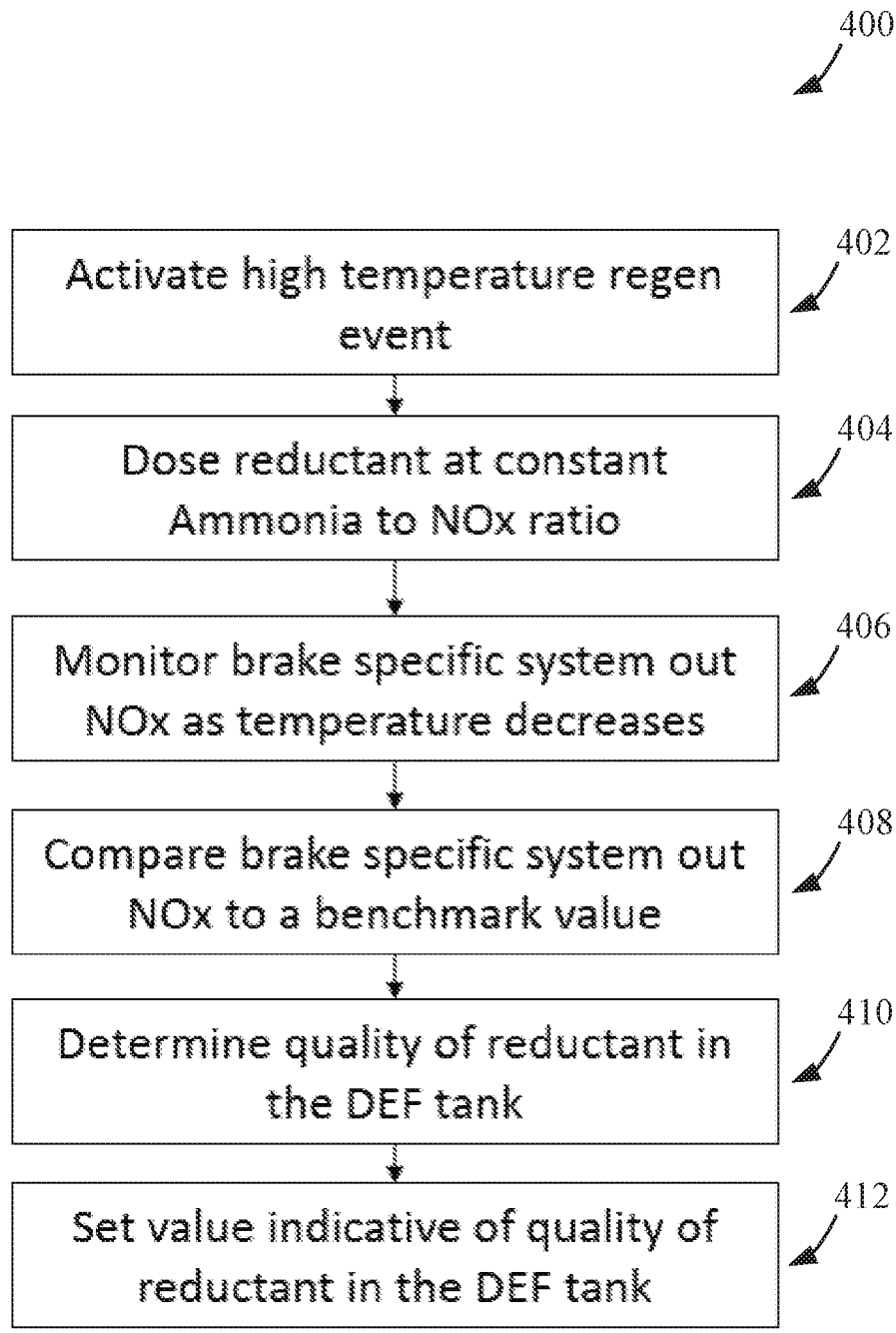
Figure 5:
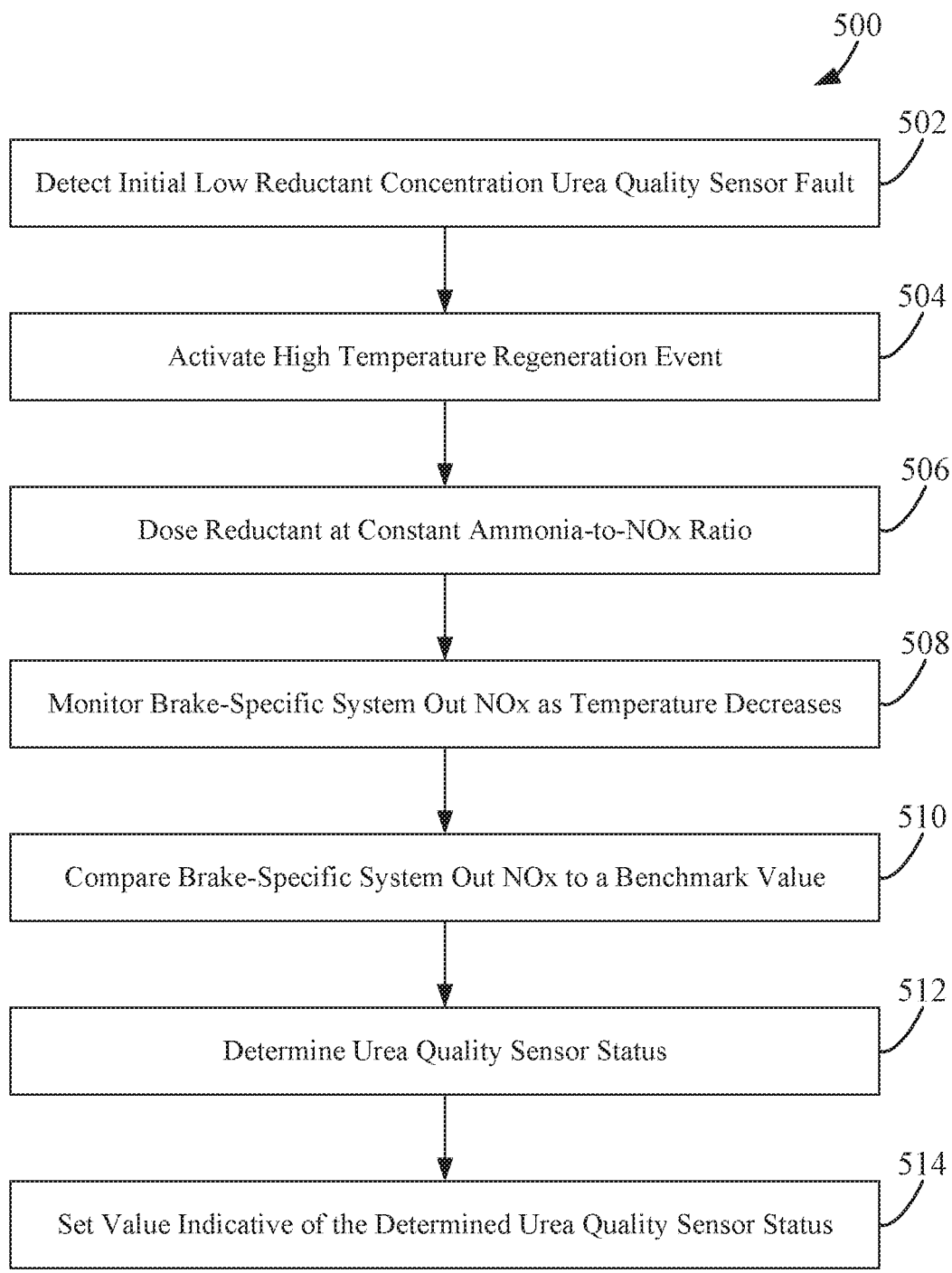

FIG. 3 is a graphical diagram depicting a brake-specific system out $NO_x$ value when dosing reductant to achieve an ammonia to engine-out $NO_x$ ratio of 1.0 after a high temperature regeneration event for an SCR catalyst unit for a reductant concentration level at 32.5% by weight representative of a normal reductant concentration and a reductant concentration level at 26% by weight representative of a low reductant concentration;

FIG. 4 is a process diagram depicting an implementation of a process for diagnosing a reductant concentration level based on the brake-specific system out $NO_x$ value; and FIG. 5 is a process diagram depicting an implementation of a process for diagnosing a reductant concentration sensor based on the brake-specific system out $NO_x$ value.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for reductant (e.g., urea) quality diagnostics for diagnosing the presence of an improper reductant. Some embodiments include diagnosing a defective reductant concentration sensor distinguished from a legitimately low reductant concentration. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Urea or other reductant compounds may be combined with water to dilute the mixture. However, if the resulting mixture is too dilute and/or if the urea or reductant breaks down over time while stored, then the low concentration may be less effective at converting $NO_x$ because the dosed amount of reductant is less than the expected amount of reductant to be dosed. Accordingly, a reductant concentration diagnostic system may be implemented to determine the reductant concentration level and to evaluate the reductant concentration level to determine whether it is proper.

In an example embodiment, the system includes a reductant concentration diagnostic module for discriminating between a low and normal concentration levels. The reductant concentration level diagnostic method includes a high temperature regeneration event to clear a catalyst unit of stored reductant. The diagnostic then intrusively modifies a dosing command to a predetermined ammonia-to-engine-out $NO_x$ ratio (ANR) once the catalyst unit bed temperature has reduced below a threshold value. The diagnostic then monitors brake-specific system out $NO_x$ (BS-SONO$_x$) values while dosing reductant based on the predetermined ANR. The diagnostic compares the monitored BS-SONO$_x$ values to a set of reference BS-SONO$_x$ values to determine an operational reductant concentration level and/or a low or diluted reductant concentration level. If the reductant concentration level is determined to be improper (e.g., too low or too high), then a controller may set a parameter to a value indicative of the failed diagnostic. In some implementations, the value for the parameter may trigger a warning lamp to be lit, such as a malfunction indicator lamp (MIL), and/or other indicators for the failed diagnostic. In other implementations, the value for the parameter may trigger other operations.

In some embodiments, a reductant concentration sensor may be implemented to monitor the concentration level of the reductant or urea in a reductant tank, in a reductant line from a reductant tank, in a doser, and/or in a portion of an exhaust pipe within an exhaust system to detect low concentration levels of reductant or urea. However, a reductant concentration sensor may also be susceptible to failure such that output values from the reductant concentration sensor may no longer be indicative of the true concentration of urea or reductant. Accordingly, a reductant concentration diagnostic method may be implemented to determine if the reductant concentration sensor has failed. In some embodiments, the method includes an in-range low diagnostic for discriminating between a true low concentration of urea or reductant and a failure of the reductant concentration sensor. In some embodiments, if the monitored BS-SONO$_x$ values are closer to the set of reference BS-SONO$_x$ values for an operational reductant concentration level, then the method includes determining that the reductant concentration sensor may have failed. If the monitored BS-SONO$_x$ values are closer to the set of reference BS-SONO$_x$ values for a low or diluted reductant concentration level, then the reductant concentration sensor may be operating normally and the initial detection of the low or diluted reductant concentration level may be accurate. If the reductant concentration sensor has failed the foregoing diagnostic, then a controller may set a parameter to a value indicative of the failed diagnostic. In some implementations, the value for the parameter may trigger a warning lamp to be lit, such as a malfunction indicator lamp (MIL), and/or other indicators for the failed diagnostic. In other implementations, the value for the parameter may trigger other operations.

II. Overview of Aftertreatment System

Figure 1:
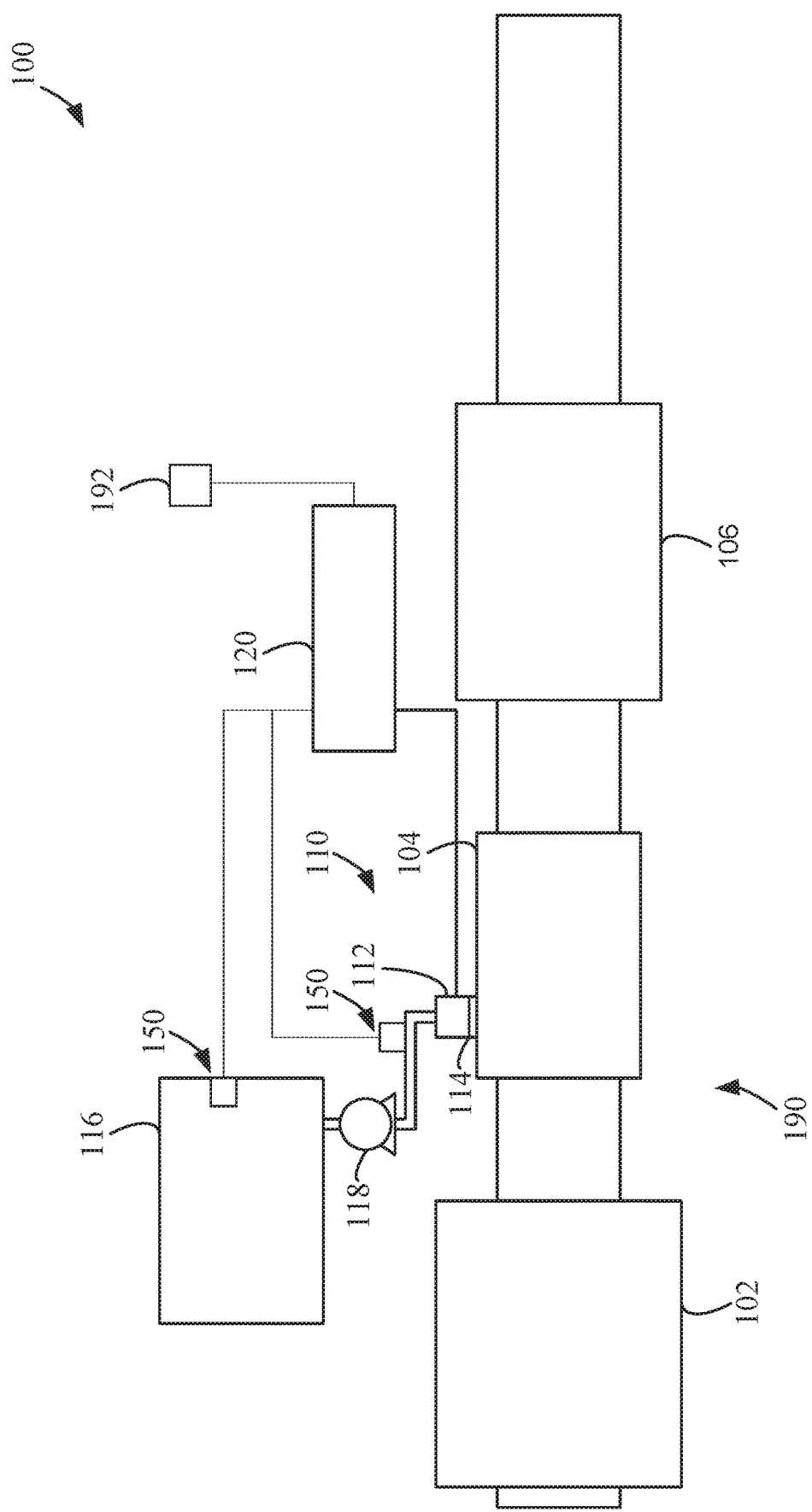
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor pipe 104, a SCR catalyst unit 106, and one or more sensors 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a doser 112 configured to dose the reductant into the decomposition chamber 104. In some implementations, the reductant is injected upstream of the SCR catalyst unit 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NO$_x$ emissions and an outlet for the exhaust gas, NO$_x$ emissions, ammonia, and/or remaining reductant to flow to the SCR catalyst unit 106.

The decomposition chamber 104 includes the doser 112 mounted to the decomposition chamber 104 such that the doser 112 may dose the reductant into the exhaust gases flowing in the exhaust system 190. The doser 112 may include an insulator 114 interposed between a portion of the doser 112 and the portion of the decomposition chamber 104 to which the doser 112 is mounted. The doser 112 is fluidly coupled to one or more reductant sources 116. In some implementations, a pump 118 may be used to pressurize the reductant from the reductant source 116 for delivery to the doser 112.

The doser 112 and pump 118 are also electrically or communicatively coupled to a controller 120. The controller 120 is configured to control the doser 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

In certain implementations, the controller 120 is structured to perform certain operations, such as those described herein in relation to FIG. 4 and/or FIG. 5. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more circuits structured to functionally execute the operations of the controller 120. In certain implementations, the controller 120 may include a reductant concentration sensor diagnostic circuit for performing the operations described in reference to FIG. 4 and/or FIG. 5. The description herein including circuits emphasizes the structural independence of the aspects of the controller 120 and illustrates one grouping of operations and responsibilities of the controller 120. Other groupings that execute similar overall operations are understood within the scope of the present application. Circuits may be implemented in hardware and/or as computer instructions on a non-transient computer readable storage medium, and circuits may be distributed across various hardware or computer based components. More specific descriptions of certain embodiments of controller operations are included in the section referencing FIG. 4 and/or FIG. 5.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The controller 120 may be in electrical communication with an output device 192. The output device 192 may be a physical indicator, such as a malfunction indicator lamp (MIL), a display, a warning horn circuit, etc. In other implementations, the output device 192 may be a communication device to communicate data values or other output from the controller 120 to other devices. For instance, the output device 192 may be a machine-to-machine communication circuit for transmitting and/or receiving data from an outside source, such as a fleet database or fleet tracking system.

The SCR catalyst unit 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst unit 106 includes inlet in fluid communication with the decomposition chamber 104 from which exhaust gas and reductant is received and an outlet in fluid communication with an end of the exhaust system 190.

The exhaust system 190 may further include an oxidation catalyst unit, for example a diesel oxidation catalyst (DOC) unit, in fluid communication with the exhaust system 190 (e.g., downstream of the SCR catalyst unit 106 or upstream of the DPF 102 to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst unit 106 may be combined into a single unit, such as a DPF with SCR-coating (SDPF). In some implementations, the doser 112 may instead be positioned downstream of a turbocharger or upstream of a turbocharger.

The sensor 150, such as a reductant concentration sensor, may be coupled to the reductant source 116, the doser 112, the conduit leading from the reductant source to the doser 112, and/or the exhaust system 190 to detect a condition of the reductant. In some implementations, the sensor 150 may have a portion disposed within the reductant source 116, the doser 112, the conduit leading from the reductant source 116 to the doser 112, and/or the exhaust system 190, such as a tip of the sensor 150 may extend into a portion of the reductant source 116, the doser 112, the conduit leading from the reductant source to the doser 112, and/or the exhaust system 190. In other implementations, the sensor 150 may receive reductant through another conduit, such as a sample pipe extending from the reductant source 116, the doser 112, the conduit leading from the reductant source to the doser 112, and/or the exhaust system 190. While the sensors 150 are depicted as positioned in the reductant source 116 and/or a line leading from the reductant source 116 to the doser 112, it should be understood that the sensor 150 may be positioned at any other position to detect the concentration of reductant. In addition, two or more sensor 150 may be utilized for detecting the concentration of reductant, such as two, three, four, five, or six sensors 150 at one or more of the reductant source 116, the doser 112, the conduit leading from the reductant source to the doser 112, and/or the exhaust system 190.

III. Example Reductant Concentration Diagnostic Systems and Methods

A reductant concentration diagnostic may be implemented to determine if the concentration of reductant (e.g., urea) in the reductant tank, such as the reductant source 116 of FIG. 1, is outside an acceptable range (e.g., too low or too high). Detection of improper reductant concentration and/or reductant concentration sensor failures may be included as part of an on-board diagnostic system. In some implementations, the value for the parameter may trigger a warning lamp to be lit, such as a malfunction indicator lamp (MIL), and/or other indicators for the failed diagnostic. In other implementations, the value for the parameter may trigger other operations.

Figure 2:
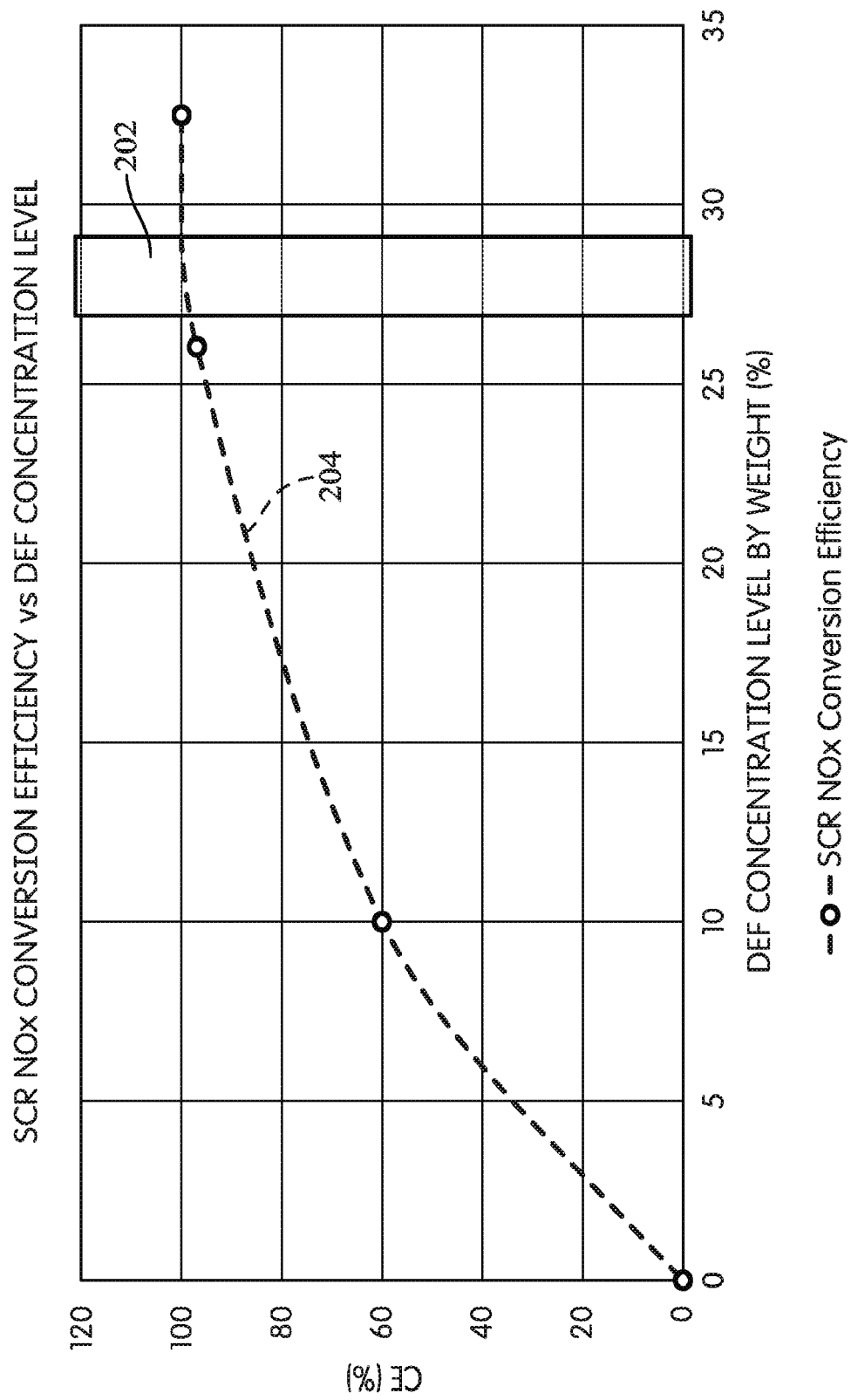
FIG. 2 is a graphical diagram of a selective catalytic reduction system conversion efficiency relative to a reductant concentration level.

FIG. 2 depicts a graph showing a conversion efficiency (CE) percentage versus a reductant concentration level by weight. The reductant can be urea, diesel exhaust fluid (DEF), or other reductant. In the low, but in-range region 202 shown at approximately 27%-29% reductant concentration level by weight, the conversion efficiency 204 begins to drop from 100% to lower efficiencies due to the reduced concentration of reductant per dose or injection by the doser. As the reductant concentration level further decreases, the conversion efficiency for a selective catalytic reduction (SCR) catalyst unit also decreases. Thus, if the reductant concentration level decreases below the lower bound of the low, but in-range region 202, then a change in conversion efficiency may be used to detect a low reductant concentration level.

However, during operation of an exhaust system with a selective catalytic reduction system, reductant can also be stored on the SCR catalyst unit to permit reduction of $NO_x$ during transient operation events where the dosed reductant from the doser may be below the amount needed to reduce the engine-out $NO_x$ during such transient events. The stored reductant on the SCR catalyst unit may make it difficult to discriminate between a low reductant concentration in the dosed reductant since the stored reductant on the SCR catalyst unit may mask or otherwise obscure the existence of the low reductant concentration. When running a system with low reductant concentration and a normal dosing strategy, test cell results do not indicate significant separation in conversion efficiency for a low reductant concentration from a system running with a sufficient reductant concentration when both systems utilize the same dosing control strategy. Accordingly, to improve the capability of detecting when a low reductant concentration level is occurring, a dosing and storage control strategy may be implemented to eliminate substantially all stored reductant on the SCR catalyst unit and then to operate the doser to dose reductant at a fixed, predetermined ANR such that a low reductant concentration level can be detected based on a measured conversion efficiency compared to the conversion efficiency 204 of FIG. 2.

If, however, the reductant, such as diesel exhaust fluid (DEF) used in the tank is not of correct concentration, an improper reductant diagnostic may be implemented to detect the presence of diluted DEF. The diagnostic can additionally be used to determine whether a faulty reductant concentration sensor incorrectly measured the DEF concentration as being the result of diluted DEF. In some embodiments, the diagnostic intrusively modifies the dosing strategy to command delivery of a predetermined amount of reductant for a predetermined ANR at which separation between a correct low reductant concentration level and a failed reductant concentration sensor can be detected.

Referring to FIG. 3, a system can utilize a measured brake-specific system-out $NO_x$ (BS-$SONO_x$) and a temperature measurement to determine whether the reductant concentration sensor is correctly detecting a low reductant concentration level or if the reductant concentration sensor has failed. In the graph shown, a first set of BS-$SONO_x$ values for a sufficient reductant concentration level 302 is shown for a range of SCR catalyst unit temperatures while the SCR system is operating at an ANR of approximately 1.0. A second set of BS-$SONO_x$ values for a low reductant concentration level 304 is shown for the number of SCR catalyst unit temperatures while the SCR system is operating at an ANR of approximately 1.0. In the implementation shown, the sufficient reductant concentration level 302 is at 32.5% reductant concentration level by weight and the low reductant concentration level 304 is at 26% reductant concentration level by weight. In some implementations, the sufficient reductant concentration level 302 can be between 30%, inclusive, to 100%, inclusive, reductant concentration level by weight. In some implementations, the low reductant concentration level 304 can be between 0%, inclusive, to 29.9%, inclusive, reductant concentration level by weight. In the implementation shown, the BS-$SONO_x$ values are acquired for a "de-greened" system, which is an SCR system in which any stored reductant on the SCR catalyst unit has been eliminated.

As shown, there is at least approximately a 0.4 gram per kilowatt-hour (g/kWh) difference separating the first set of BS-$SONO_x$ values for a sufficient reductant concentration level 302 from the second set of BS-$SONO_x$ values for a low reductant concentration level 304 when measured at the same SCR catalyst unit bed temperature. A measured BS-$SONO_x$ value for a particular SCR temperature after substantially eliminating any stored reductant from the SCR catalyst unit and operating the system at an ANR of 1.0 may be compared to a value of the first set of BS-$SONO_x$ values for a sufficient reductant concentration level 302 and/or a value of the second set of BS-$SONO_x$ values for a low reductant concentration level 304 to determine whether the measured BS-$SONO_x$ value is closer to the value for the sufficient reductant concentration level 302 or the value for the low reductant concentration level 304. In some implementations, an absolute error between the measured BS-$SONO_x$ value and the value of the first set of BS-$SONO_x$ values for a sufficient reductant concentration level 302 and/or the value of the second set of BS-$SONO_x$ values for a low reductant concentration level 304 can be determined to detect whether the measured BS-$SONO_x$ value is closer to the value for the sufficient reductant concentration level 302 or the value for the low reductant concentration level 304. In still other implementations, the first set of BS-$SONO_x$ values for a sufficient reductant concentration level 302 and/or the second set of BS-$SONO_x$ values for a low reductant concentration level 304 may be threshold values to detect whether the measured BS-$SONO_x$ value is above or below the threshold value. In some implementations, the first set of BS-$SONO_x$ values for a sufficient reductant concentration level 302 and/or the second set of BS-$SONO_x$ values for a low reductant concentration level 304 may be normalized to a 0 to 1.0 scale for the SCR catalyst unit temperature and the measured BS-$SONO_x$ value is normalized and compared to a single threshold value from the normalized scale.

If the measured BS-$SONO_x$ value is closer to the value of the first set of BS-$SONO_x$ values for a sufficient reductant concentration level 302, there could be DEF of normal concentration in the tank. If the measured BS-$SONO_x$ value is closer to the value of the second set of BS-$SONO_x$ values for a low reductant concentration level 304, then the DEF in the tank has indeed been diluted.

FIG. 4 is a process diagram depicting an implementation of a process 400 for diagnosing a reductant concentration based on the brake-specific system out $NO_x$ value. The process 400 includes activating a high-temperature regeneration event such that the temperature of the catalyst bed increases to a pre-determined range suitable for catalyst unit regeneration (block 402). The activation of the high temperature regeneration event may include injecting and burning fuel in the exhaust system, operating the engine to produce a higher engine out temperature, etc. The high temperature regeneration event substantially eliminates or reduces an stored reductant on an SCR catalyst unit to a minimal amount such that the $NO_x$ conversion efficiency is substantially a result of the reductant dosed by the doser into the exhaust system.

The process 400 includes dosing reductant at a constant ANR (block 404). Dosing the reductant at a constant ANR permits a comparison between a measured BS-$SONO_x$ value and one or more predetermined or pre-measured BS-$SONO_x$ values at substantially the same ANR and at substantially the same SCR catalyst unit temperature. In some implementations, the constant ANR is preset, such as an ANR of 1.0.

In some implementations, the command for the doser to dose reductant may be compensated for gain, such as that resulting from noise from one or more sensors sensing a system-out $NO_x$ value and/or engine-out $NO_x$ value. That is, the amount of reductant dosed by the doser into the exhaust system is calculated to substantially match the engine-out $NO_x$ such that, if the reductant concentration level is sufficient, substantially all of the $NO_x$ is reduced by the dosed reductant.

The process 400 includes monitoring the brake-specific system out $NO_x$ (BS-$SONO_x$) as a temperature of an SCR catalyst unit decreases (block 406). In some implementations, a discrete single measurement of BS-$SONO_x$ can be measured at a predetermined SCR catalyst unit temperature and/or several discrete BS-$SONO_x$ measurements can occur at several predetermined SCR catalyst unit temperatures. The SCR catalyst unit temperature for the discrete single measurement or set of several discrete measurements can be between 240° C., inclusive, and 440° C., inclusive.

The process 400 further includes comparing a BS-$SONO_x$ measurement value to a benchmark value (block 408). In some implementations, the benchmark value is a value of the first set of BS-$SONO_x$ values for a sufficient reductant concentration level 302 and/or a value of the second set of BS-$SONO_x$ values for a low reductant concentration level 304 at substantially the same SCR temperature of FIG. 3. In some implementations, an absolute error between the measured BS-$SONO_x$ value and the value of the first set of BS-$SONO_x$ values for a sufficient reductant concentration level 302 and/or the value of the second set of BS-$SONO_x$ values for a low reductant concentration level 304 can be determined to detect whether the measured BS-$SONO_x$ value is closer to the value for the sufficient reductant concentration level 302 or the value for the low reductant concentration level 304. In still other implementations, the first set of BS-$SONO_x$ values for a sufficient reductant concentration level 302 and/or the second set of BS-$SONO_x$ values for a low reductant concentration level 304 may be threshold values to detect whether the measured BS-$SONO_x$ value is above or below the threshold value. In some implementations, the benchmark value is a normalized threshold value relative to the SCR temperature. That is, the first set of BS-SONO$_x$ values for a sufficient reductant concentration level 302 and/or the second set of BS-SONO$_x$ values for a low reductant concentration level 304 may be normalized to a 0 to 1.0 scale for the SCR catalyst unit temperature, and the measured BS-SONO$_x$ value is normalized and compared to a single threshold value from the normalized scale as the benchmark value.

The process 400 includes determining the quality of reductant (e.g., urea) in the reductant tank (block 410). The determination of the reductant quality status is based on the comparison of the measured BS-SONO$_x$ value to the benchmark value. If the measured BS-SONO$_x$ value is closer to the value of the first set of BS-SONO$_x$ values for a sufficient reductant concentration level 302 and/or is below the value of the second set of BS-SONO$_x$ values for a low reductant concentration level 304, then the reductant in the reductant tank is of normal concentration. Alternatively, this could be used to imply that if a reductant concentration sensor had detected normal reductant to be dilute, the sensor status could be assessed as being faulty, which, in some embodiments, is determined as described in reference to FIG. 5. If the measured BS-SONO$_x$ value is closer to the value of the second set of BS-SONO$_x$ values for a low reductant concentration level 304 and/or is above the value of the first set of BS-SONO$_x$ values for a sufficient reductant concentration level 302, then the reductant concentration sensor may be outputting a correct low reductant concentration value. This indicates that that the reductant in the reductant tank is dilute, and the perceived dilution of the reductant by the reductant concentration sensor may be used to imply that the sensor status is such that the sensor operates correctly.

The process 400 further includes setting a value indicative of the determined quality of reductant in the reductant tank (block 412). If the reductant concentration is too low, then a controller may set a parameter to a value indicative of the failed diagnostic. In some implementations, the value for the parameter may trigger a warning lamp may to be lit, such as a malfunction indicator lamp (MIL), a heads-up display, a warning horn circuit, and/or other indicators for the failed diagnostic. In other implementations, the set value may be used by an output device, such as output device 192 of FIG. 1, to communicate data values or other output from a controller to other devices. For instance, the output device may be a machine-to-machine communication circuit for transmitting and/or receiving data from an outside source, such as a fleet database or fleet tracking system. In other implementations, the set value for the parameter may trigger other operations.

FIG. 5 depicts an implementation of a process 500 for a rationality diagnostic for a reductant concentration sensor. The diagnostic includes an in-range low diagnostic for discriminating between a correct low concentration of reductant and a failure of the reductant concentration sensor. If the reductant concentration sensor has failed the diagnostic, then a controller may set a parameter to a value indicative of the failed diagnostic. In some implementations, the diagnostic may be implemented to ensure sensor rationality such that a failed sensor can be determined and detected separate from a low reductant concentration output value. Such failure detection can prevent or limit incorrect process requests that could be triggered due to a faulty reductant concentration sensor reading. In some implementations, the reductant concentration diagnostic may be performed at an in-range, but legitimately low reductant concentration value to distinguish between a faulty reductant concentration sensor and a correctly measured low reductant concentration. Accordingly, the operability of the reductant concentration sensor may be determined before the reductant concentration is at such a low level that the exhaust system exceeds predetermined emissions values (e.g., regulatory parameters).

The process 500 includes detecting an initial low reductant concentration (block 502). The initial low reductant concentration may be a parameter value, output voltage, and/or set flag by a reductant concentration sensor responsive to a sensed reductant concentration being below a predetermined threshold, such as 30% reductant concentration by weight. In some implementations, the detected initial low reductant concentration value or flag may be received by a controller, such as controller 120 of FIG. 1, and be temporarily stored to trigger the process 500.

Responsive to the initial low reductant concentration, the process 500 includes activating a high temperature regeneration event (block 504). The activation of the high temperature regeneration event may include injecting and burning fuel in the exhaust system, operating the engine to produce a higher engine out temperature, etc. The high temperature regeneration event substantially eliminates or reduces a stored reductant on an SCR catalyst unit to a minimal amount such that the NO$_x$ conversion efficiency is substantially a result of the reductant dosed by the doser into the exhaust system.

The process 500 includes dosing reductant at a constant ANR (block 506). In some implementations, the constant ANR is preset, such as an ANR of 1.0. In some implementations, the command for the doser to dose reductant may be compensated for gain, such as that resulting from noise from one or more sensors sensing a system-out NO$_x$ and/or engine-out NO$_x$ value. That is, the amount of reductant dosed by the doser into the exhaust system is calculated to substantially match the engine-out NO$_x$ such that, if the reductant concentration level is sufficient, substantially all of the NO$_x$ is reduced by the dosed reductant. Dosing the reductant at a constant ANR permits a comparison between a measured BS-SONO$_x$ value and one or more predetermined or pre-measured BS-SONO$_x$ values at substantially the same ANR and at substantially the same SCR catalyst unit temperature.

The process 500 includes monitoring the brake-specific system out NO$_x$ (BS-SONO$_x$) as a temperature of an SCR catalyst unit decreases (block 508). In some implementations, a discrete single measurement of BS-SONO$_x$ can be measured at a predetermined SCR catalyst unit temperature and/or several discrete BS-SONO$_x$ measurements can occur at several predetermined SCR catalyst unit temperatures. The SCR catalyst unit temperature for the discrete single measurement or set of several discrete measurements can be between 240° C., inclusive, and 440° C., inclusive.

The process 500 further includes comparing a BS-SONO$_x$ measurement value to a benchmark value (block 510). In some implementations, the benchmark value is a value of the first set of BS-SONO$_x$ values for a sufficient reductant concentration level 302 or a value of the second set of BS-SONO$_x$ values for a low reductant concentration level 304 at substantially the same SCR temperature of FIG. 3. In some implementations, an absolute error between the measured BS-SONO$_x$ value and the value of the first set of BS-SONO$_x$ values for a sufficient reductant concentration level 302 and/or the value of the second set of BS-SONO$_x$ values for a low reductant concentration level 304 can be determined to detect whether the measured BS-SONO$_x$ value is closer to the value for the sufficient reductant concentration level 302 or the value for the low reductant concentration level 304. In still other implementations, the first set of BS-SONO$_x$ values for a sufficient reductant concentration level 302 and/or the second set of BS-SONO$_x$ values for a low reductant concentration level 304 may be threshold values to detect whether the measured BS-SONO$_x$ value is above or below the threshold value. In some implementations, the benchmark value is a normalized threshold value relative to the SCR temperature. That is, the first set of BS-SONO$_x$ values for a sufficient reductant concentration level 302 and/or the second set of BS-SONO$_x$ values for a low reductant concentration level 304 may be normalized to a 0 to 1.0 scale for the SCR catalyst unit temperature and the measured BS-SONO$_x$ value is normalized and compared to a single threshold value from the normalized scale.

The process 500 includes determining a reductant concentration sensor status (block 512). The determination of the reductant quality status is based on the comparison of the measured BS-SONO$_x$ value to the benchmark value. If the measured BS-SONO$_x$ value is closer to the value of the first set of BS-SONO$_x$ values for a sufficient reductant concentration level 302 and/or is below the value of the second set of BS-SONO$_x$ values for a low reductant concentration level 304, then the reductant concentration sensor may be outputting an incorrect low reductant concentration value. That is, the initial low reductant concentration reductant concentration sensor fault (block 502) is erroneous based on the measured BS-SONO$_x$ of the rationality diagnostic and the reductant sensor quality status is determined to be a failed sensor. If the measured BS-SONO$_x$ value is closer to the value of the second set of BS-SONO$_x$ values for a low reductant concentration level 304 and/or is above the value of the first set of BS-SONO$_x$ values for a sufficient reductant concentration level 302, then the reductant concentration sensor may be outputting a correct low reductant concentration value. That is, the initial low reductant concentration reductant concentration sensor fault (block 502) is not incorrect based on the measured BS-SONO$_x$ of the rationality diagnostic and the reductant sensor quality status is determined to be operational.

The process 500 further includes setting a value indicative of the determined reductant concentration sensor status (block 514). If the reductant concentration sensor has failed the foregoing diagnostic, then a controller may set a parameter to a value indicative of the failed diagnostic. In some implementations, the value for the parameter may trigger a warning lamp may to be lit, such as a malfunction indicator lamp (MIL), a heads-up display, a warning horn circuit, and/or other indicators for the failed diagnostic. In other implementations, the set value may be used by an output device, such as output device 192 of FIG. 1, to communicate data values or other output from a controller to other devices. For instance, the output device may be a machine-to-machine communication circuit for transmitting and/or receiving data from an outside source, such as a fleet database or fleet tracking system. In other implementations, the set value for the parameter may trigger other operations.

If the reductant concentration sensor has not failed the foregoing diagnostic, then a controller may set a parameter to a value indicative of the passed diagnostic and the quality sensor fault value or flag (block 502) may be stored or otherwise used. In some implementations, the initial low reductant concentration reductant concentration sensor fault may trigger a warning lamp may to be lit, such as a malfunction indicator lamp (MIL), a heads-up display, a warning horn circuit, and/or other indicators for the low reductant concentration reductant concentration sensor fault.

In other implementations, the quality sensor fault value or flag may be used by an output device, such as output device 192 of FIG. 1, to communicate data values or other output from a controller to other devices. For instance, the output device may be a machine-to-machine communication circuit for transmitting and/or receiving data from an outside source, such as a fleet database or fleet tracking system. In other implementations, the quality sensor fault value or flag may trigger other operations.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for diagnosing an improper reductant concentration, the system comprising:
   a selective catalytic reduction (SCR) catalyst unit;
   a doser configured to dose reductant into a chamber of the SCR catalyst unit;
   reductant concentration sensor; and
   a controller configured to:
      direct the doser to dose the reductant into the chamber of the SCR catalyst unit,
      based on information received from the reductant concentration sensor, determine a reductant concentration level in the chamber of the SCR catalyst unit,
      compare a measured system-out NO value to at least one benchmark value corresponding to the determined reductant concentration level,
      determine if a concentration of the reductant dosed by the doser is outside an acceptable range based on the comparison of the measured system-out $NO_x$ value to the at least one benchmark value, and
      calculate an amount of reductant to be dosed by the doser to compensate for noise from one or more sensors configured to capture a value of the measured system-out $NO_x$.

2. The system of claim 1, wherein the reductant concentration sensor is configured to detect the reductant concentration for the reductant dosed by the doser, wherein the controller is further configured to determine a status of the reductant concentration sensor based at least on the comparison of the measured system-out $NO_x$ value to the at least one benchmark value.

3. The system of claim 1, Wherein the controller is further configured to set a value indicative of the determined concentration of the reductant dosed by the doser.

4. The system of claim 3, wherein the controller is further configured to trigger a warning lamp to be lit based on an interpretation of the set value.

5. The system of claim 3, Wherein the controller is further configured to output the set value to an auxiliary device via an output device.

6. The system of claim 1, wherein the measured system-out $NO_x$ value is a brake-specific system-out $NO_x$ (BS-$SONO_x$) value.

7. The system of claim 1, wherein the at least one benchmark value is a first benchmark value, and wherein the controller is further configured to set the first benchmark value to a value selected from a first set of system-out $NO_x$ values indicative of a sufficient reductant concentration level at a predetermined SCR catalyst unit temperature.

8. The system of claim 7, wherein the controller is further configured to set a second benchmark value to a value selected from a second set of system-out $NO_x$, values indicative of a low reductant concentration level at the predetermined SCR catalyst unit temperature.

9. The system of claim 8, wherein the controller is further configured to generate a single threshold value for the first set of system-out $NO_x$ values and the second set of system-out $NO_x$, values by normalizing the first benchmark value and the second benchmark value.

10. The system of claim 9, wherein the controller is further configured to:
    normalize the first set of system-out $NO_x$ values for a sufficient reductant concentration, relative to the SCR catalyst unit temperature, to a 0 to 1.0 scale;
    normalize the second set of system-out $NO_x$ values for a low reductant concentration, relative to the SCR catalyst unit temperature, to the 0 to 1.0 scale;
    select a normalization factor from the 0 to 1.0 scale, the normalization factor corresponding to the SCR catalyst unit temperature;
    determine a normalized measured system-out $NO_x$ value; and
    compare the normalized measured system-out $NO_x$ value to the threshold.

11. The system of claim 7, wherein the controller is further configured to measure the system-out $NO_x$ value when the SCR catalyst unit is determined to be at the predetermined SCR catalyst unit temperature.

12. The system of claim 1, wherein the controller is further configured to activate a high temperature regeneration event at a temperature between 480 and 600 degrees Celsius of the SCR catalyst unit prior to comparing the measured system-out $NO_x$ value to the at least one benchmark value.

13. The system of claim 1, wherein the controller is further configured to control the doser to dose reductant to maintain a constant ammonia-to-$NO_x$ ratio (ANR) prior to comparing the measured system-out $NO_x$ value to the at least one benchmark value.

14. The system of claim 13, wherein the controller is further configured to calculate the amount of reductant to be dosed by the doser to match the measured system-out $NO_x$, value such that substantially all of the $NO_x$ is reduced by the reductant.

15. The system of claim 1, wherein the controller is further configured to monitor the measured system out $NO_x$ value as a temperature of the SCR catalyst unit decreases, the temperature of the SCR catalyst unit being in a range of 220 degrees Celsius and 440 degrees Celsius.

16. A method for diagnosing an improper reductant concentration, the method comprising:
   directing a doser to dose a reductant into a chamber of the selective catalytic;
   reduction (SCR) catalyst unit;
   detecting a reductant concentration level in the chamber of the SCR catalyst unit;
   comparing a measured system-out $NO_x$ value to at least one benchmark value corresponding to the determined reductant concentration level;
   determining if a concentration of the reductant dosed by the doser is outside an acceptable range based on the comparison of the measured system-out $NO_x$, value to the at least one benchmark value; and
   calculating an amount of reductant to be dosed by the doser to compensate for noise from one or more sensors configured to capture a value of the measured system-out $NO_x$.

17. The method of claim 16, further comprising determining a status of a reductant concentration sensor based at least on the comparison of the measured system-out $NO_x$ value to the at least one benchmark value, wherein the reductant concentration sensor is configured to detect the reductant concentration for the reductant dosed by the closer.

18. The method of claim 16, wherein the measured system-out $NO_x$ value is a brake-specific system-out $NO_x$ (BS-$SONO_x$) value.

19. The method of claim 16, the method further comprising setting the at least one benchmark value to a value selected from at least one set of system-out $NO_x$ values indicative of a reductant concentration level at a predetermined SCR catalyst unit temperature.

20. The method of claim 16, further comprising removing any stored residual reductant from the SCR catalyst unit prior to detecting the reductant concentration level.

21. The method of claim 16, further comprising dosing reductant to maintain a constant ammonia-to-$NO_x$ ratio (ANR).

22. The method of claim 16, further comprising calculating the brake-specific system out $NO_x$ value as a temperature of the SCR catalyst unit decreases, the temperature of the SCR catalyst unit being in a range of 220 degrees Celsius and 440 degrees Celsius.

23. A system for diagnosing an improper reductant concentration, the system comprising:
   a selective catalytic reduction (SCR) catalyst unit;
   a doser configured to dose reductant into a chamber of the SCR catalyst unit;
   a reductant concentration sensor; and
   a controller configured to:
      direct the doser to dose the reductant into the chamber of the SCR catalyst unit,
      based on information received from the reductant concentration sensor, determine a reductant concentration level in the chamber of the SCR catalyst unit,
      set a first benchmark value to a value selected from a first set of system-out $NO_x$ values indicative of a sufficient reductant concentration level at a predetermined SCR catalyst unit temperature,
      set a second benchmark value to a value selected from a second set of system-out $NO_x$ values indicative of a low reductant concentration level at the predetermined SCR catalyst unit temperature,
      generate a single threshold value for the first set of system-out $NO_x$ values and the second set of system-out $NO_x$ values by normalizing the first benchmark value and the second benchmark value,
      compare a measured system-out $NO_x$ value to the single threshold value corresponding to the determined reductant concentration level, and
      determine if a concentration of the reductant dosed by the doser is outside an acceptable range based on the comparison of the measured system-out $NO_x$ value to the single benchmark value.

24. A method for diagnosing an improper reductant concentration, the method comprising:
   directing a doser to dose the reductant into the chamber of the selective catalytic reduction (SCR) catalyst unit;
   detecting a reductant concentration level in the chamber of the SCR catalyst unit;
   setting a first benchmark value to a value selected from a first set of system-out $NO_x$ values indicative of a sufficient reductant concentration level at a predetermined SCR catalyst unit temperature;
   setting a second benchmark value to a value selected from a second set of system-out $NO_x$ values indicative of a low reductant concentration level at the predetermined SCR catalyst unit temperature;
   generating a single threshold value for the first set of system-out $NO_x$ values and the second set of system-out $NO_x$ values by normalizing the first benchmark value and the second benchmark value;
   comparing a measured system-out $NO_x$ value to the single threshold value corresponding to the determined reductant concentration level; and
   determining if a concentration of the reductant dosed by the doser is outside an acceptable range based on the comparison of the measured system-out $NO_x$ value to the single benchmark value.

* * * * *